US012766859B2

(12) United States Patent
Shimojima et al.

(10) Patent No.: US 12,766,859 B2
(45) Date of Patent: Oct. 20, 2026

(54) MEDIUM DETECTOR AND IMAGE FORMING APPARATUS

(71) Applicants: Kazuhiro Shimojima, Kanagawa (JP); Hiroaki Miyagawa, Kanagawa (JP)

(72) Inventors: Kazuhiro Shimojima, Kanagawa (JP); Hiroaki Miyagawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 135 days.

(21) Appl. No.: 18/669,908

(22) Filed: May 21, 2024

(65) Prior Publication Data

US 2024/0391260 A1 Nov. 28, 2024

(30) Foreign Application Priority Data

May 25, 2023 (JP) ................................ 2023-086443

(51) Int. Cl.

| | |
|---|---|
| ***B41J 11/00*** | (2006.01) |
| ***B41J 11/62*** | (2006.01) |
| ***B41J 13/22*** | (2006.01) |
| ***B65H 7/14*** | (2006.01) |

(52) U.S. Cl.

CPC ............ *B41J 11/0095* (2013.01); *B41J 11/62* (2013.01); *B41J 13/223* (2013.01); *B65H 7/14* (2013.01)

(58) Field of Classification Search

CPC ...... B41J 11/0095; B41J 11/62; B41J 13/223; B65H 7/14

See application file for complete search history.

(56) References Cited

U.S. PATENT DOCUMENTS 3,512,885 A * 5/1970 Wirley ............... G03G 15/6502 399/79
2017/0253022 A1* 9/2017 Henn ................. B41F 33/0063

FOREIGN PATENT DOCUMENTS

| | | | | |
|---|---|---|---|---|
| JP | 2010-076872 | | 4/2010 | |
| JP | 2011-195221 A | | 10/2011 | |
| JP | 2012166347 A | * | 9/2012 | ............. B41J 11/42 |
| JP | 2016-175737 | | 10/2016 | |
| JP | 2017-165564 A | | 9/2017 | |
| JP | 2020-085745 | | 6/2020 | |
| JP | 2022-063088 | | 4/2022 | |

OTHER PUBLICATIONS

Extended European search report for EP24176432.3 mailed on Oct. 28, 2024.

* cited by examiner

*Primary Examiner* — Yaovi M Ameh
(74) *Attorney, Agent, or Firm* — IPUSA, PLLC

(57) ABSTRACT

A medium detector includes: a medium sensor to emit light to detect a medium conveyed by a drum in a conveyance direction; a sensor holder to hold the medium sensor; a light shield to shield a part of the light emitted from the medium sensor in the axial direction of the drum orthogonal to the conveyance direction; and a housing: rotatably supporting the drum; and holding the sensor holder and the light shield.

19 Claims, 10 Drawing Sheets

COMPARATIVE EXAMPLE

COMPARATIVE EXAMPLE

MEDIUM DETECTOR AND IMAGE FORMING APPARATUS

CROSS-REFERENCE TO RELATED APPLICATIONS

This patent application is based on and claims priority pursuant to 35 U.S.C. § 119(a) to Japanese Patent Application No. 2023-086443, filed on May 25, 2023, in the Japan Patent Office, the entire disclosure of which is hereby incorporated by reference herein.

BACKGROUND

Technical Field

The present embodiment relates to a medium detector and an image forming apparatus.

Related Art

An image forming apparatus conveys a medium along an outer peripheral surface of a drum-shaped member and forms an image on the medium. In the image forming apparatus, when the medium floats from the outer peripheral surface of the drum-shaped member, the quality of image formation may be affected. Therefore, an image forming apparatus includes a medium detector that detects the degree of floating from the outer peripheral surface of the medium.

In a configuration of a medium detector, a detection beam parallel to a surface of a medium is emitted from a light emitter toward a light receiver, and whether or not the detection beam is blocked by the medium when the medium is conveyed is detected to determine floating of the medium. Therefore, the position adjustment of the detection beam needs to be performed with high accuracy.

SUMMARY

In an aspect of the present disclosure, a medium detector includes: a medium sensor to emit light to detect a medium conveyed by a drum in a conveyance direction; a sensor holder to hold the medium sensor; a light shield to shield a part of the light emitted from the medium sensor in the axial direction of the drum orthogonal to the conveyance direction; and a housing: rotatably supporting the drum; and holding the sensor holder and the light shield.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
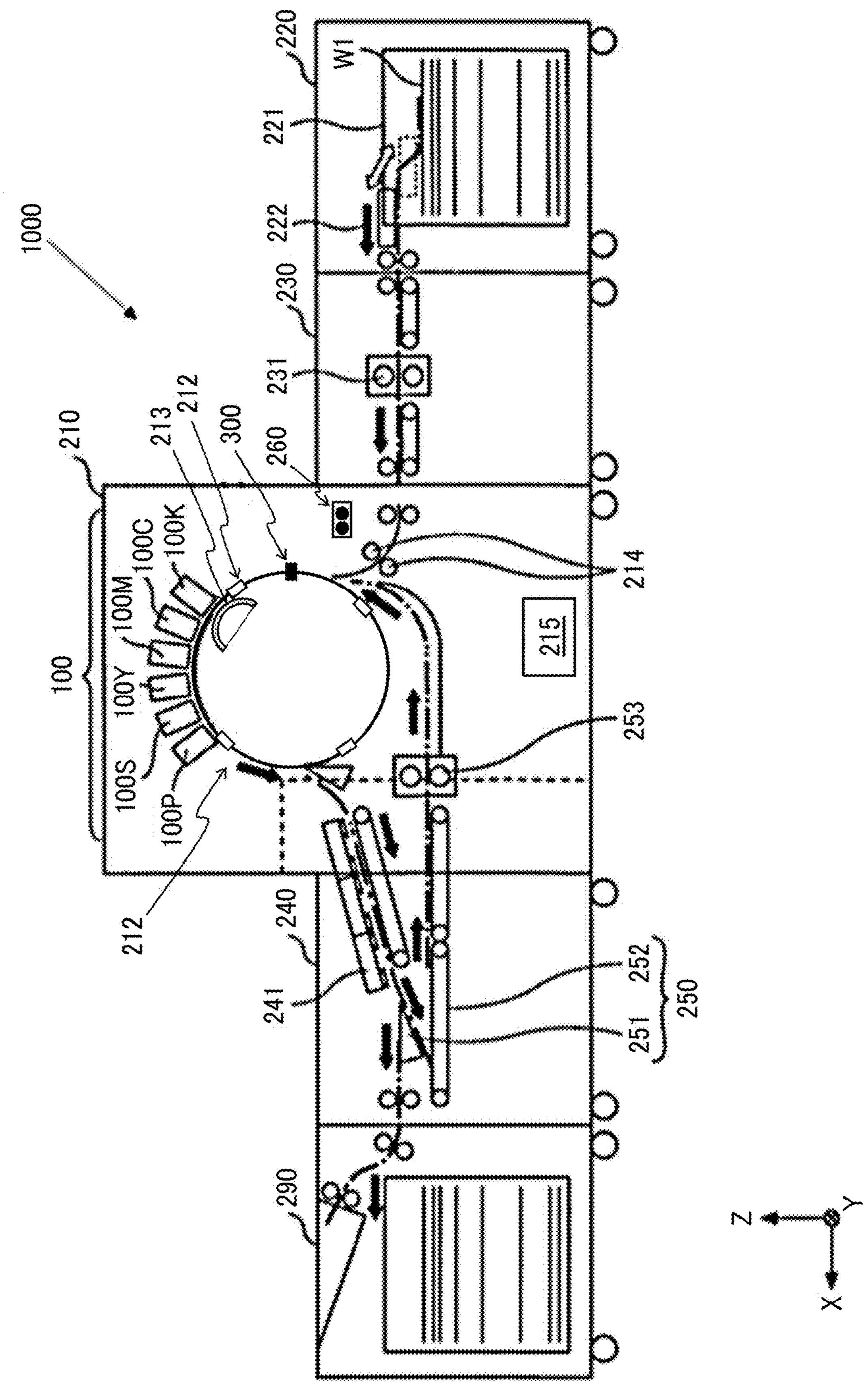
FIG. 1 is a schematic view illustrating a general arrangement of one embodiment of an image forming apparatus according to the present embodiment.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Image forming apparatus according to one embodiment of present embodiment

Hereinafter, an embodiment according to the present embodiment will be described with reference to the drawings. First, a configuration of an inkjet printer 1000 will be described as an embodiment of an image forming apparatus according to the present embodiment.

FIG. 1 is a diagram illustrating a general arrangement of an inkjet printer 1000. The inkjet printer 1000 is, for example, an image forming apparatus adopting an on-demand type line scanning type, and includes an image former 210, a paper feeder 220, a resist adjuster 230, a dryer 240, a recording medium reversing unit 250, a paper ejecting unit 290, and a floating detector 300.

First, the sheets W serving as a recording medium stacked on a sheet feeding stack 221 of the paper feeder 220 are picked up one by one by an air separator 222 and conveyed in the direction of the image former 210. When the sheet W conveyed from the paper feeder 220 reaches the resist adjuster 230, the inclination of the sheet W with respect to the conveyance direction is corrected by a registration roller pair 231 provided inside the resist adjuster 230.

The sheet W subjected to correction (registration adjustment) by the registration roller pair 231 is sent to the image former 210. Then, the sheet is sent to the surface of a drum 211 cylinder-shaped by a conveyance roller pair 214. The drum 211 is provided with multiple recording medium grippers 212. The leading end of the sent sheet W is sandwiched by one recording medium gripper 212, and is conveyed to a position facing the multiple head arrays 100 (100K to 100P) by the rotation of the drum 211.

In the image former 210, multiple head arrays 100 that discharges liquid ink by an inkjet method is arranged, in a state of being filled with a predetermined ink color, along a surface in a rotation direction of the drum 211 cylinder-shaped. Each head array 100 is arranged at a predetermined radial position in accordance with the degree of bending of the outer peripheral surface of the drum 211. The angle of each head array 100 is adjusted such that the liquid discharge direction is orthogonal to the surface of the drum 211. That is, the head arrays 100 are arranged at different angles in the radial direction from the rotation axis of the drum 211.

In other words, the facing angles of the multiple head arrays 100 serving as the liquid discharge modules with respect to the drum 211 are each adjusted so as to discharge ink (liquid) onto the outer peripheral surface of the sheet W held on the surface of the drum 211 toward the rotation center of the drum 211.

A dummy discharge receiver 213 is provided on the outer peripheral surface of the drum 211, and receives the dummy-discharged ink when the head array 100 is not discharging the ink on the sheet W. After the image is formed, the sheet W is conveyed to the dryer 240.

The dryer 240 is provided with a drying unit 241, and moisture of the sheet W evaporates as the sheet W passes below the drying unit 241. Further, the dryer 240 is provided with a recording medium reversing unit 250 including a recording medium reversing mechanism 251. At the time of duplex printing, the recording medium reversing unit 250 reverses the sheet W and a reverse conveyance unit 252 conveys the sheet W in the direction of the image former 210 again. Note that the inclination of the sheet W is corrected by a registration roller 253 provided inside the image former 210 before reaching the drum 211. The sheet W that has been dried by the dryer 240 is conveyed to the paper ejecting unit 290, and is stacked in a state where the end portion of the sheet W is aligned.

A part of the control of the droplet discharge operation in the image former 210 is performed by an image forming controller 215 included in the image former 210. The image forming controller 215 can control the entire operation of the inkjet printer 1000, and also executes the floating detection control process of the sheet W in the floating detector 300. Note that each of the paper feeder 220, the resist adjuster 230, the dryer 240, and the floating detector 300 may individually include a controller to control the entire operation of the inkjet printer 1000 in cooperation with the image forming controller 215.

In the image former 210, multiple head arrays 100 that discharges liquid ink by an inkjet method is arranged, in a state of being filled with a predetermined ink color, along a surface in a rotation direction of the drum 211 cylinder-shaped. Each head array 100 is arranged at a predetermined radial position in accordance with the degree of bending of the outer peripheral surface of the drum 211. The angle of each head array 100 is adjusted such that the liquid discharge direction is orthogonal to the surface of the drum 211. That is, each head array 100 is different in the radial direction from the rotation axis of the drum 211.

In other words, the facing angles of the multiple head arrays 100 serving as the liquid discharge heads with respect to the drum 211 are each adjusted so as to discharge ink (liquid) onto the outer peripheral surface of the sheet W held on the surface of the drum 211 toward the rotation center of the drum 211.

A dummy discharge receiver 213 is provided on the outer peripheral surface of the drum 211, and receives the dummy-discharged ink when the head array 100 is not discharging the ink on the sheet W. After the image is formed, the sheet W is conveyed to the dryer 240.

The dryer 240 is provided with a drying unit 241, and moisture of the sheet W evaporates as the sheet W passes below the drying unit 241. Further, the dryer 240 is provided with a recording medium reversing unit 250 including a recording medium reversing mechanism 251. At the time of duplex printing, the recording medium reversing unit 250 reverses the sheet W and a reverse conveyance unit 252 conveys the sheet W in the direction of the image former 210 again. Note that the inclination of the sheet W is corrected by a registration roller 253 provided inside the image former 210 before reaching the drum 211. The sheet W that has been dried by the dryer 240 is conveyed to the paper ejecting unit 290, and is stacked in a state where the end portion of the sheet W is aligned.

A part of the control of the droplet discharge operation in the image former 210 is performed by an image forming controller 215 included in the image former 210. The image forming controller 215 may control the entire operation of the inkjet printer 1000. Further, each of the paper feeder 220, the resist adjuster 230, and the dryer 240 may individually include a controller to control the entire operation of the inkjet printer 1000 in cooperation with the image forming controller 215.

As illustrated in FIG. 1, the conveyance direction of the sheet W is the X direction. The rotation direction of the drum 211 that conveys the sheet W when the image forming processing is executed is the CCW direction (counterclockwise direction) on the X-Z plane.

The inkjet printer 1000 further includes an inching button 260 serving as an operation unit for the user to operate the rotation and rotation stop of the drum 211. The inching button 260 has, for example, two independent push buttons. While the user presses the inching button 260, forward rotation (or reverse rotation) is performed by the user's manual operation in a direction corresponding to the button.

The inkjet printer 1000 further includes a floating detector 300. The floating detector 300 detects floating of the sheet W (deviation from the outer peripheral surface of the drum 211) when the sheet W is, in a state of being held by the recording medium gripper 212 and along the outer peripheral surface of the drum 211, conveyed toward the multiple head arrays 100. That is, the floating detector 300 is a device for detecting that the conveyance position of the sheet W with respect to the outer peripheral surface of the drum 211 is an appropriate position. Therefore, a sensor for detecting the position of the sheet W with respect to the outer peripheral surface (drum outer peripheral surface) of the drum 211 is used to detect whether or not the sheet W floats with respect to the outer peripheral surface (whether or not the sheet W is at an appropriate position) on the basis of the state in which the sheet W is detected by the sensor.

Medium detector according to one embodiment of present embodiment

Figure 2:
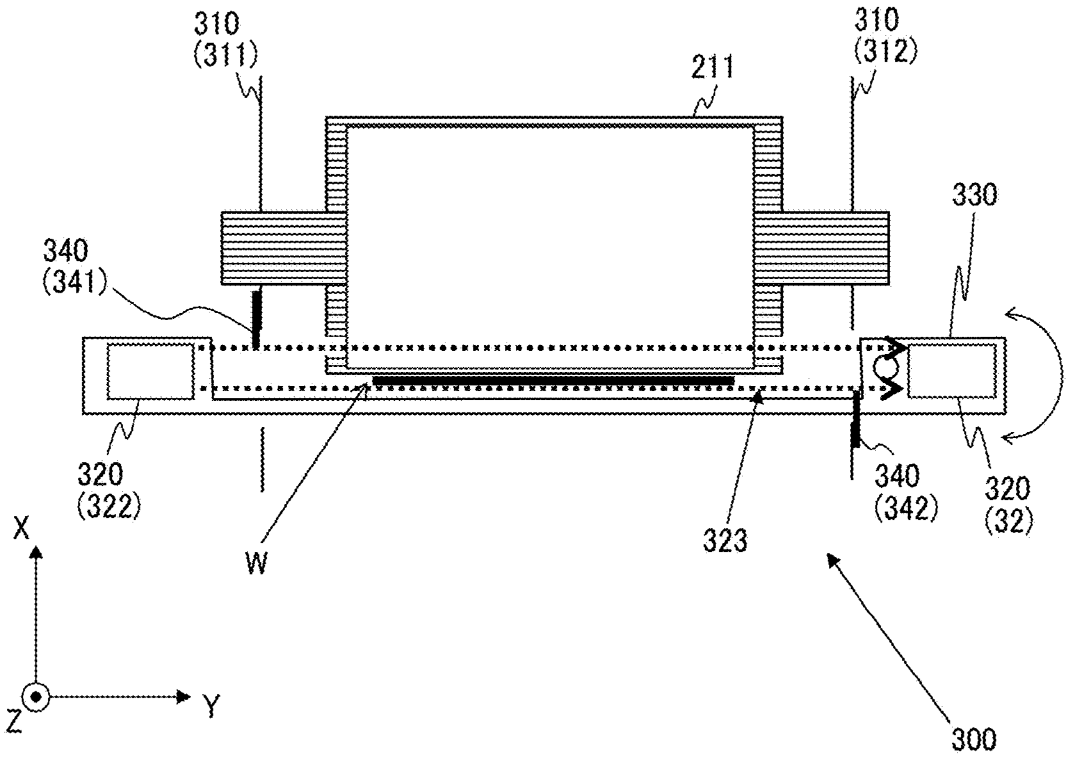
FIG. 2 is a schematic view illustrating a general arrangement of one embodiment of a medium detector according to the present embodiment.
Figure 3:
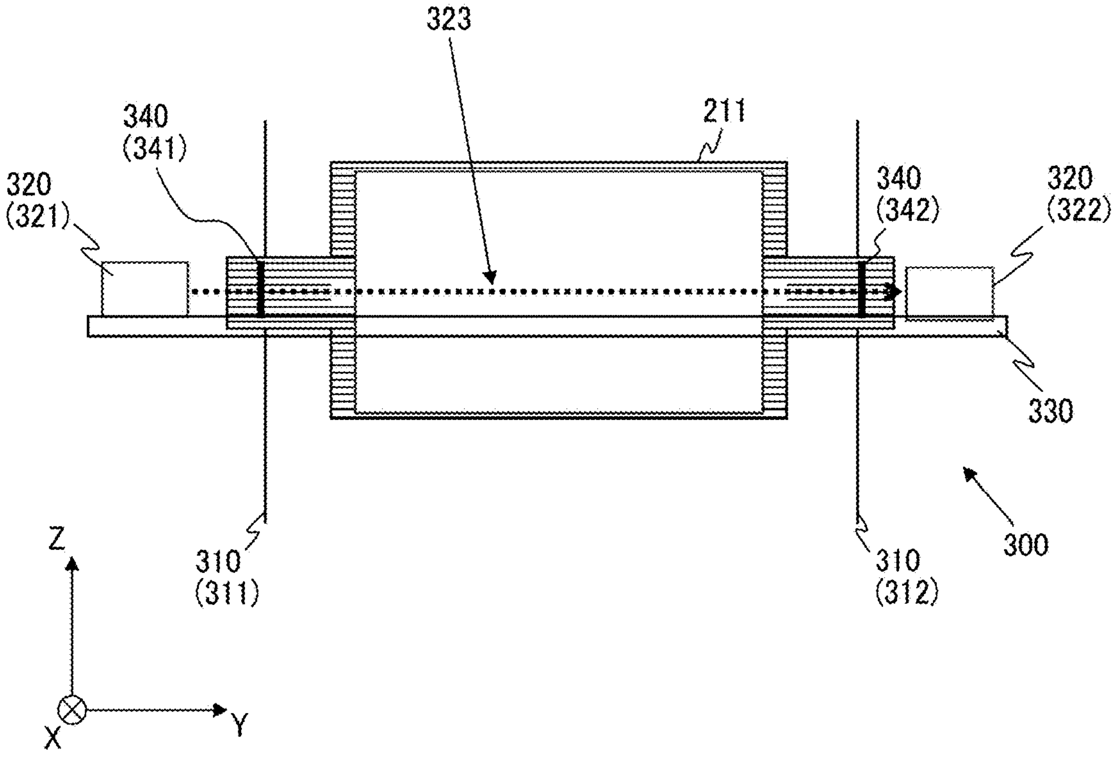
FIG. 3 is a configuration diagram of a sensor holder included in the medium detector according to the present embodiment.
Figure 4:
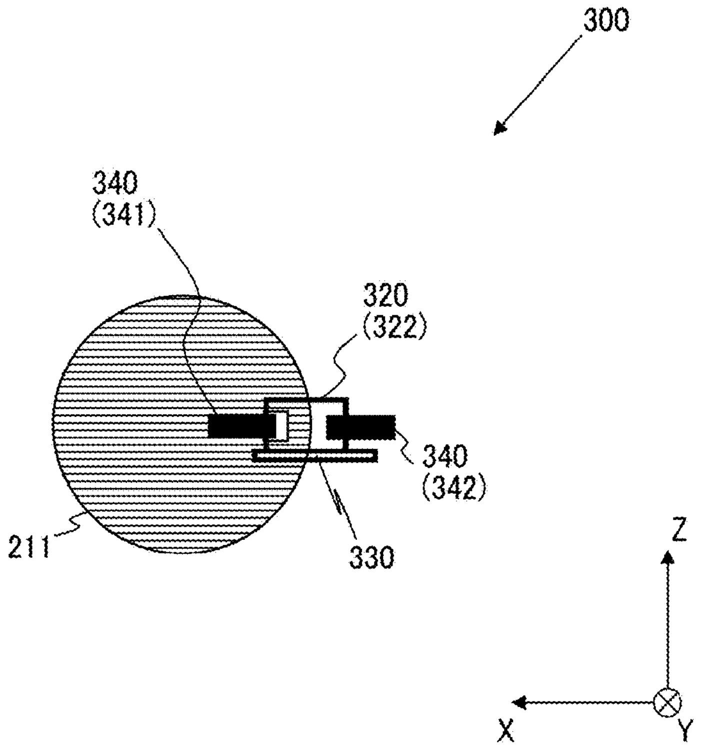
FIG. 4 is a configuration diagram of a sensor holder included in the medium detector according to the present embodiment.
Figure 5:
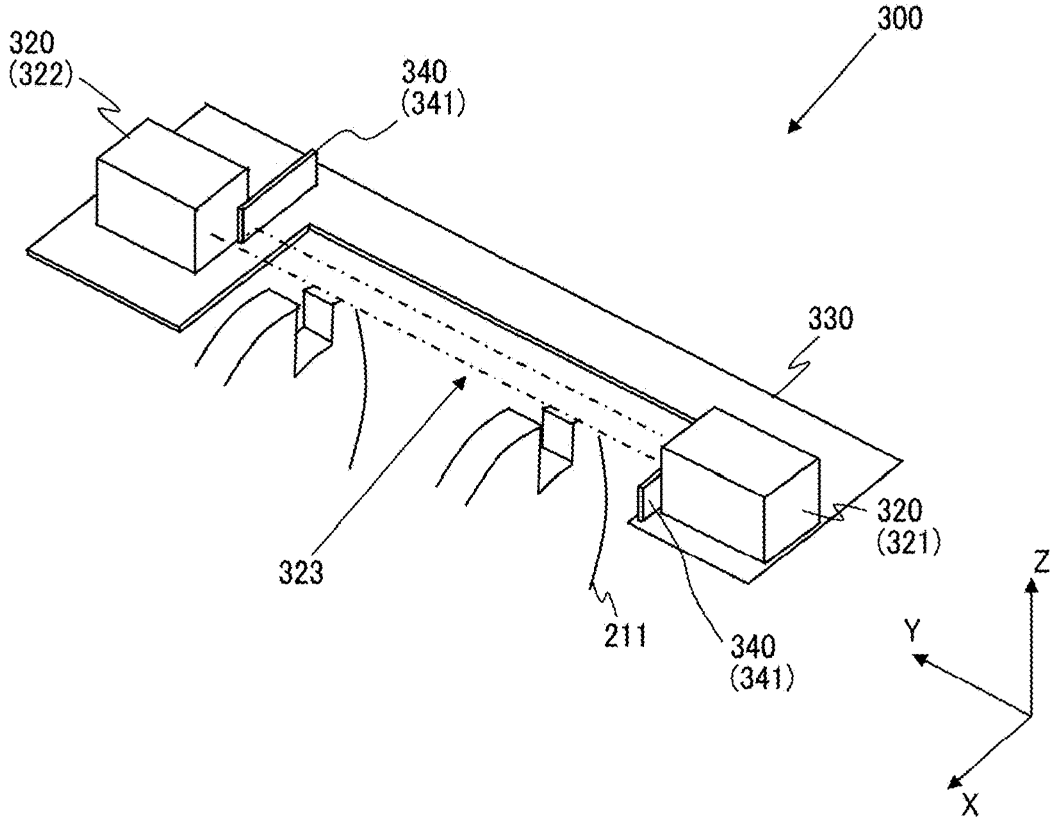
FIG. 5 is a configuration diagram of a sensor holder included in the medium detector according to the present embodiment.

Next, a floating detector 300 as an embodiment of the medium detector according to the present embodiment will be described. FIGS. 2 to 5 are diagrams illustrating a general arrangement of the floating detector 300. FIG. 2 is a view (top view) as viewed from a direction orthogonal to the conveyance direction of the sheet W. FIG. 3 is a view (right side view) as viewed from the upstream to the downstream in the conveyance direction of the sheet W. FIG. 4 is a front view of the drum 211 as viewed from the axial direction. FIG. 5 is a perspective view illustrating a main configuration of the floating detector 300.

As illustrated in FIGS. 2 to 5, in the floating detector 300, the drum 211 serving as a drum-shaped member is supported and can rotate between a front frame 311 and a rear frame 312 of a housing 310. The drum-shaped member includes a drum, for example.

The housing 310 may correspond to a part of the main body housing of the inkjet printer 1000, or may be a separate body provided in the internal space of the main body housing. The housing 310 only needs to maintain a predetermined positional relationship with drum 211. The floating detector 300 attached to the inkjet printer 1000 functions as a medium detector of the inkjet printer 1000.

The floating detector 300 includes a sheet detection sensor 320. The sheet detection sensor 320 includes a pair of a light emitter 321 serving as a light emitting sensor that emits a detection light 323 and a light receiver 322 serving as a light reception sensor that receives the detection light 323, the light emitter and the light receiver being arranged to face each other. The light emitter 321 and the light receiver 322 output an output signal that changes depending on the amount of light received by the light receiver 322 from the detection light 323 emitted from the light emitter 321. By determining the level (output value) of the output signal from the light receiver 322 in the image forming controller 215, it is possible to detect the presence or absence of an object that blocks the detection light 323 emitted from the light emitter 321.

Both the light emitter 321 and the light receiver 322 of the sheet detection sensor 320 are held by a sensor bracket 330 serving as a sensor holder. The light emitter 321 and the light receiver 322 are held by the sensor bracket 330 and maintained in a predetermined relative positional relationship.

The sensor bracket 330 supports the sheet detection sensor 320 to maintain parallel relationship between the detection light 323 emitted from the sheet detection sensor 320 and the outer peripheral surface of the drum 211 in the axial direction. For example, as is clear from FIGS. 3 and 4, the sensor bracket 330 is a flat plate-shaped member in which the axial direction of the drum 211 is the longitudinal direction and the direction orthogonal to the axial direction of the drum 211 is the lateral direction.

As will be described later, the light emitter 321 and the light receiver 322 of the sheet detection sensor 320 are held at positions separated from each other in the longitudinal direction of the sensor bracket 330. Then, the detection light 323 is emitted from the light emitter 321 as band-shaped laser beam parallel to the flat plate surface of the sensor bracket 330 and received by the light receiver 322.

Therefore, position adjustment and parallel adjustment between the detection light 323, which is emitted from the sheet detection sensor 320 held by the sensor bracket 330, and the drum 211 can be performed by adjusting the position and posture of the sensor bracket 330 with respect to the drum 211. Therefore, the sensor bracket 330 is supported by the housing 310 in a manner that the sensor bracket 330 can rotate on a surface parallel to the conveyance direction of the sheet W conveyed along the outer peripheral surface of the drum 211.

The sensor bracket 330 holds the detection light 323 used by the sheet detection sensor 320 in a manner that the detection light 323 can rotate in a direction perpendicular to the optical axis direction of the detection light 323. Details regarding a mode of holding the sheet detection sensor 320 with respect to the sensor bracket 330 and a structure that enables the rotation described above will be described later.

The housing 310 includes a front frame 311 that supports one end side of the rotation axis of the drum 211 and a rear frame 312 that supports the other end side of the rotation axis. The drum 211 is supported by housing 310 and can rotate at a predetermined position. In addition, the housing 310 includes a light shield 340 that shields a part of the detection light 323 and forms a gap through which the other part of the detection light 323 can pass without being shielded.

The light shield 340 includes a first light shield 341 secured to the front frame 311 and a second light shield 342 secured to the rear frame 312, the first light shield 341 and the second light shield 342 being arranged to face each other. The first light shield 341 and the second light shield 342 are precisely secured to the housing 310 so that their positions in the direction orthogonal to the direction of the rotation axis of the drum 211 (longitudinal direction of drum 211, X-axis direction in FIG. 2), that is, in the radial direction of the drum 211, form a predetermined relative positional relationship.

The first light shield 341 and the second light shield 342 are secured at positions corresponding to a space between the light emitter 321 and the light receiver 322 (inside the sheet detection sensor 320). Therefore, a part of the detection light 323 emitted from the light emitter 321 is shielded by the first light shield 341 and the second light shield 342.

The detection light 323 is band-shaped laser beam and thus has a constant width dimension. As described above, the width of the detection light 323 in the optical axis direction is wider than the gap formed when the shadow of the first light shield 341 and the shadow of the second light shield 342 are projected in the axial direction of the drum 211. Therefore, the detection light 323 is limited to a predetermined width by passing a space, which is narrower than the light width, between the first light shield 341 and the second light shield 342. Hereinafter, a width (interval) which is formed by the first light shield 341 and the second light shield 342 and through which the detection light 323 can pass is referred to as an "arrangement distance" of the light shielding means.

That is, the arrangement distance corresponds to a distance of a gap generated between the first light shield 341 and the second light shield 342 when the first light shield 341 and the second light shield 342 are projected in the axial direction of the rotation axis of the drum 211.

The detection light 323 is emitted in the axial direction of drum 211 like a band-shaped laser beam having a width corresponding to an arrangement interval between the first light shield 341 and the second light shield 342. The width of the detection light 323 to be the band-shaped laser beam is the detection width for detecting the floating of the sheet W from the drum 211.

Note that, in order to limit the light width of the detection light 323 on the basis of the predetermined arrangement distance of the housing, instead of the first light shield 341 and the second light shield 342 described above, a notch formed by cutting out a part of the housing 310 may be used.

In this case, the notch may be formed at a position and in a shape that exerts the same function and effect as those of the first light shield 341 and the second light shield 342.

The position and direction of the detection light 323 with respect to the drum 211 are adjusted, with respect to the drum 211, by rotating the sensor bracket 330 that holds the sheet detection sensor 320. At this time, the arrangement interval between the first light shield 341 and the second light shield 342 is adjusted by securing the first light shield 341 and the second light shield 342 to the housing 310 with high accuracy in advance. Therefore, by adjusting the sensor bracket 330, the arrangement interval between the first light shield 341 and the second light shield 342 can be set to a state in which the detection light 323 passes. That is, as illustrated in FIGS. 7A and 7B, the position and direction of the detection light 323 can be adjusted by rotating the sensor bracket 330 such that the detection light 323 is parallel to the axis of the drum 211 and the detection width becomes equal to the arrangement interval of the light shield 340.

A description is given of the configuration of the drum 211.

Figure 7A:
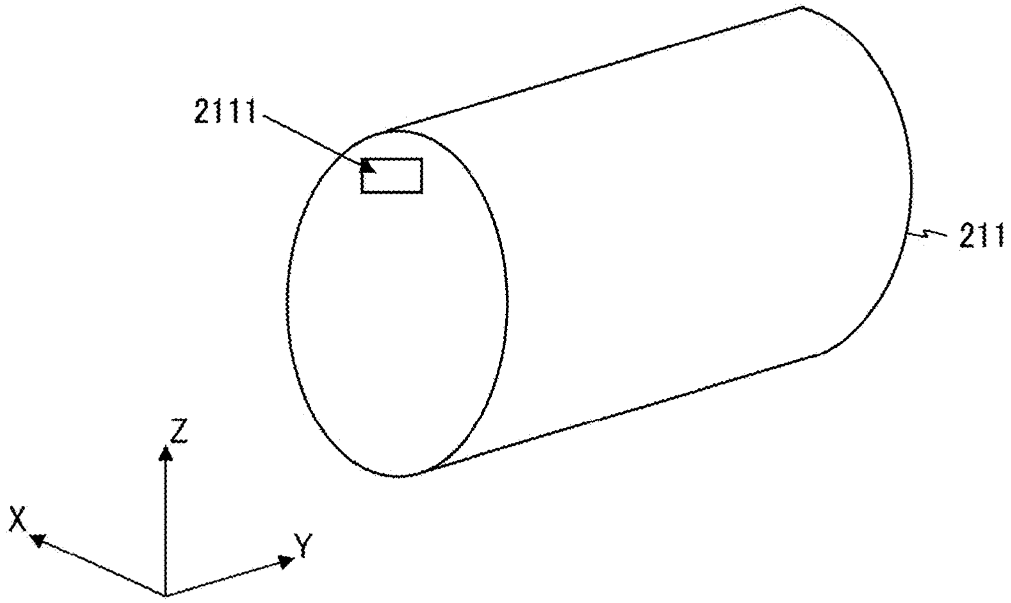
FIGS. 7A and 7B are diagrams illustrating an example of a drum-shaped member according to the present embodiment.
Figure 7B:
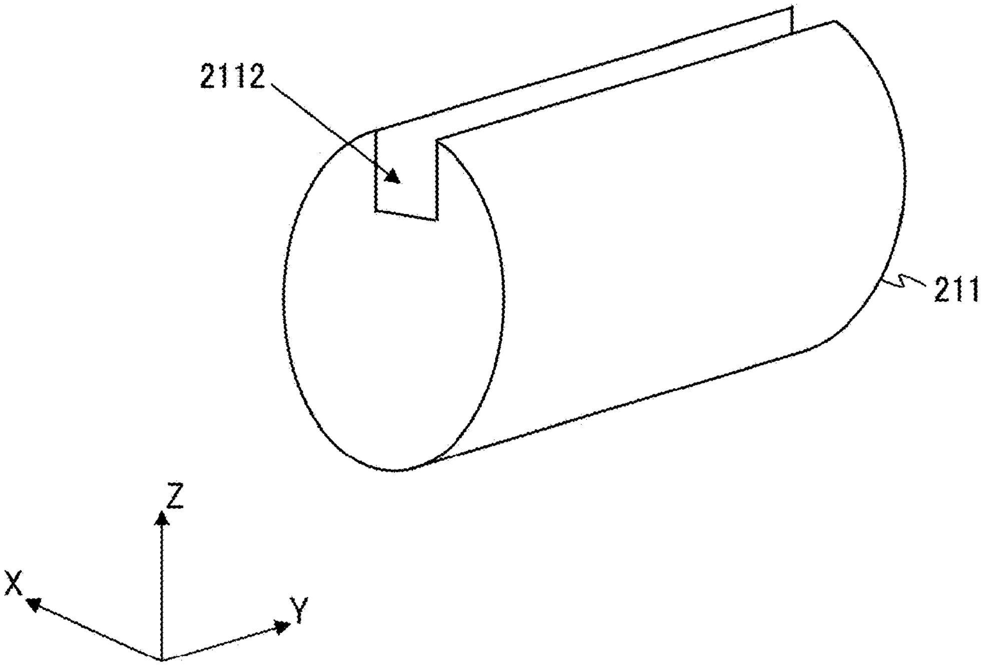

FIGS. 7A and 7B are perspective views of the drum 211. The detection light 323 that is the band-shaped laser beam is in a positional relationship of being blocked by the drum 211 located in the optical axis direction. Therefore, as illustrated in FIG. 7A, the drum through hole 2111 serving as the penetrating portion of the drum 211 is provided, or as illustrated in FIG. 7B, a notch is provided in a part of the outer peripheral surface of the drum 211, and the drum recess 2112 serving as the penetrating portion of the drum 211 is provided, so that the lower end of the detection light 323 can be read.

Note that either the drum through hole 2111 or the drum recess 2112 may be used. The multiple penetrating portions may be formed in the circumferential direction of the drum 211.

Sensor holder and medium detection sensor according to one embodiment of present embodiment.

Here, a relationship between the sensor bracket 330 serving as a sensor holder and the sheet detection sensor 320 serving as a medium detection sensor will be described with reference to FIG. 8.

Figure 8:
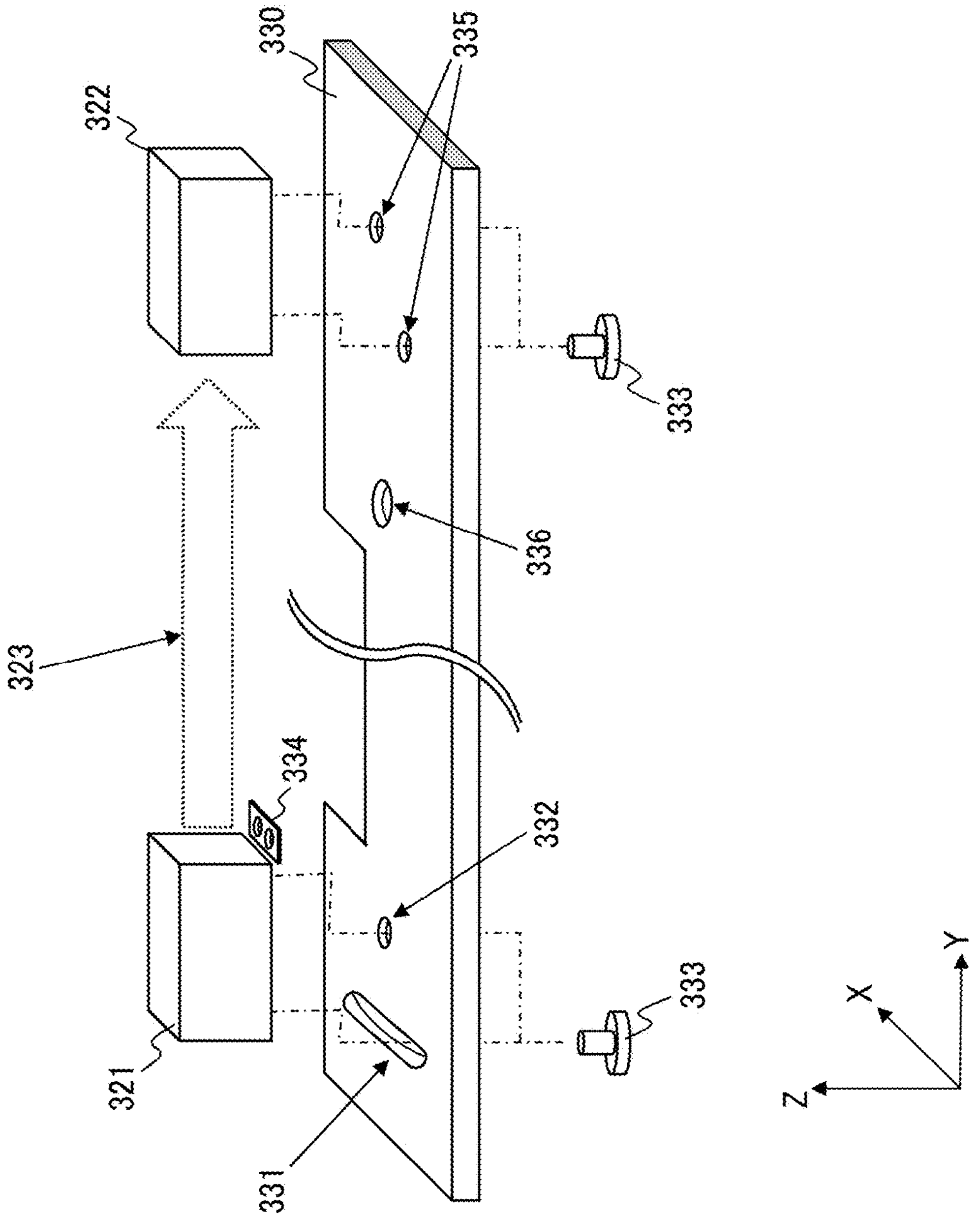
FIG. 8 is a configuration diagram of a sensor holder included in the medium detector according to the present embodiment.

FIG. 8 is a view for describing an outline of the sensor bracket 330, and is a view for describing an assembly mode of the sheet detection sensor 320. As described with reference to FIGS. 3 and 4, the sensor bracket 330 is a long flat plate member, and the longitudinal direction corresponds to the axial direction of the drum 211 (see FIG. 2 and the like). The sensor bracket 330 has a structure in which the light emitter 321 is secured to one end portion and the light receiver 322 is secured to the other end portion in the longitudinal direction.

In the sensor bracket 330, a sensor rotation long hole 331 and an optical axis rotation hole 332 are formed in the vicinity of the end portion on the side where the light emitter 321 is secured, and a light receiver securing round hole 335 is formed in the vicinity of the end portion on the side where the light receiver 322 is secured. Therefore, the light receiver 322 is secured to the sensor bracket 330 in a predetermined direction (direction facing the light emitter 321) at a predetermined position.

The sensor rotation long hole 331 is included in an adjuster for adjusting the direction of the light emitter 321 with respect to the light receiver 322 in order to adjust the emission direction of the detection light 323. When adjusting the direction of the light emitter 321, the light emitter 321 rotates along the sensor rotation long hole 331 with the optical axis rotation hole 332 as the rotation center, the optical axis rotation hole 332 serving as an axis of rotating the direction of the light emitter 321.

The light emitter 321 is fastened to the sensor bracket 330 by a screw 333 through the sensor rotation long hole 331 and the optical axis rotation hole 332. By rotating the light emitter 321 along the surface of the sensor bracket 330 in a state where the screw 333 on the optical axis rotation hole 332 side is loosened, the left and right directions of the light emitter 321 can be adjusted. That is, the sensor bracket 330 can hold the light emitter 321 in a state where the emission direction of the detection light 323 can be adjusted in the left-right direction.

In addition, the light emitter 321 can adjust the direction of the detection light 323 in the up-down direction by holding the light emitter 321 on the sensor bracket 330 with a spacer 334 serving as the height adjustment member sandwiched between the light emitter 321 and the surface of the sensor bracket 330, on the optical axis rotation hole 332 side and the sensor rotation long hole 331 side. By adjusting the thickness of the spacer 334, the amount of the up-down direction of the detection light 323 can be adjusted. For example, in a case where the detection light 323 that is the laser beam is directed downward with respect to the light receiver 322, the spacer 334 is sandwiched in the position of the optical axis rotation hole 332 so that the detection light 323 is directed upward. In a case where the detection light 323 is directed upward with respect to the light receiver 322, the spacer 334 is sandwiched in the position of the sensor rotation long hole 331 so that the detection light 323 is directed downward. That is, the sensor bracket 330 can hold the light emitter 321 in a state where the emission direction of the detection light 323 can be adjusted in the up-down direction.

The accuracy of the position of the optical axis of the sheet detection sensor 320 is affected by the accuracy of the sensor bracket 330. Therefore, the optical axis can be adjusted by adjusting the holding state of one or both of the light emitter 321 and the light receiver 322 in the up-down direction and the left-right direction of the optical axis of the sheet detection sensor 320 in a state where the light emitter 321 and the light receiver 322 are held by the sensor bracket 330.

In this regard, as illustrated in FIG. 8, the light receiver 322 is secured to the sensor bracket 330 by screw fastening using a screw 333 serving as a fastening member through a positioning hole (round hole 355). Then, the light emitter 321 is secured to the sensor bracket 330 by screw fastening to a positioning hole (optical axis rotation hole 332) and the sensor rotation long hole 331 using the screw 333 serving as a fastening member, and a part of the light emitter 321 can move along the longitudinal direction of the sensor rotation long hole 331 around the optical axis rotation hole 332 serving as a rotation center. As a result, the left-right direction of the detection light 323 emitted from the light emitter 321 can be adjusted.

The emission direction of the detection light 323 can be adjusted in the up-down direction (height direction) by the spacer 334 between the light emitter 321 and the sensor bracket 330. When the relative height of the detection light 323 with respect to the light receiving window of the light receiver 322 does not match, the presence or absence of the spacer 334 and the thickness of the spacer 334 are adjusted.

In addition, the sensor bracket 330 has a rotation hole 336 so that the sensor bracket 330 can rotate in a state of being secured to the housing 310.

Figure 6:
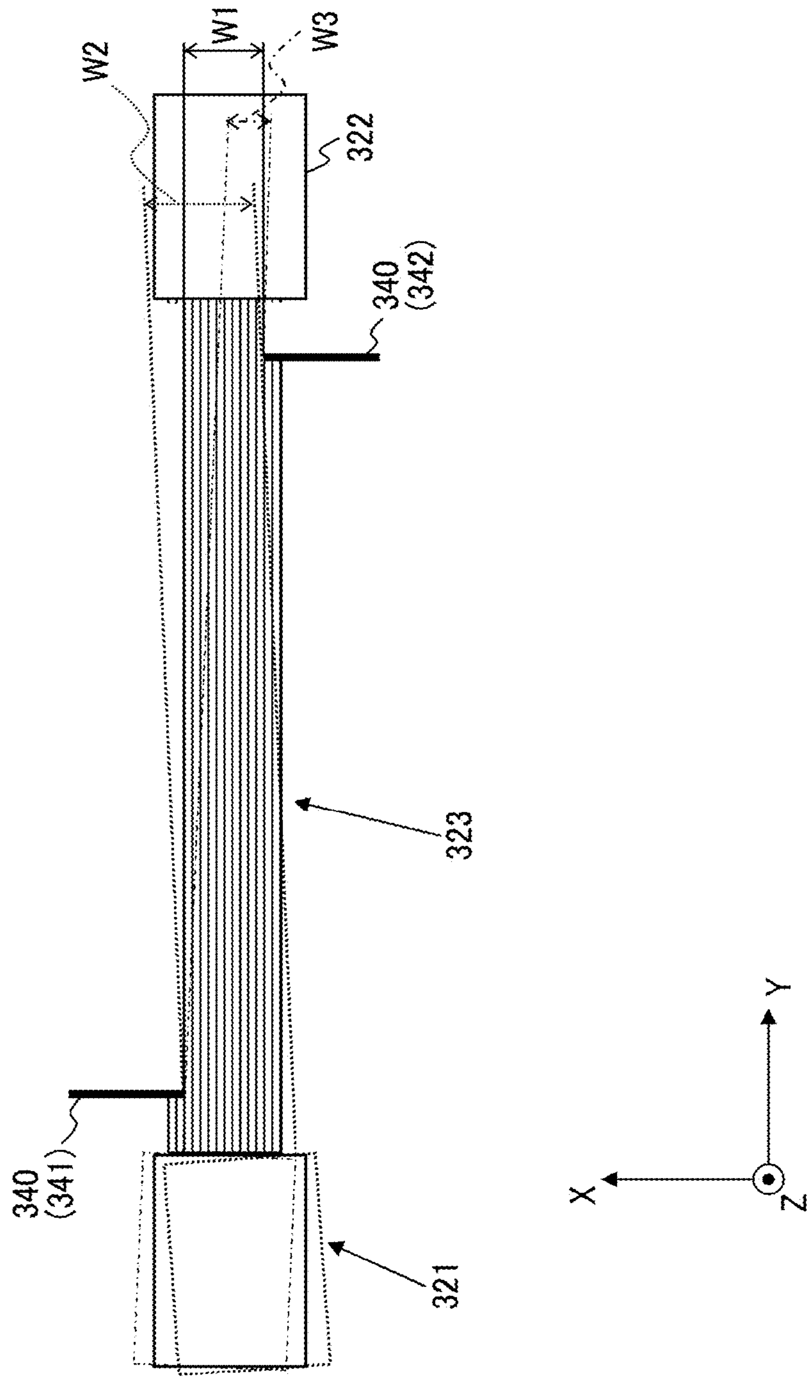
FIG. 6 illustrates a method of adjusting the position of the sensor holder according to the present embodiment.

When the detection light 323 and the outer peripheral surface of the drum 211 are aligned in parallel using the sensor bracket 330 having the above configuration, the sensor bracket 330 is rotated while the sensor bracket 330 is secured to the housing 310 using the fastening member through the rotation hole 336 as illustrated in FIG. 6. Thus, the width of the detection light 323 is adjusted to an appropriate width.

FIG. 6 illustrates an example of the detection light 323 which is depicted by the solid line and is parallel to the outer peripheral surface of the drum 211. The output value of the sheet detection sensor 320 based on the light width (first width W1) of the detection light 323 in this state is the output value when the adjustment of the detection light 323 is appropriate. Therefore, the detection light 323 can be accurately adjusted by rotating the sensor bracket 330 while monitoring the output value of the sheet detection sensor 320.

When the detection light 323 has the second width W2 wider than the first width W1, the output value in the case of the second width W2 is larger than the output value in the case of the first width W1 because the second width W2 is too wide than the appropriate width. On the other hand, when the detection light 323 has the third width W3 narrower than the first width W1, the output value in the case of the third width W3 is smaller than the output value in the case of the first width W1 because the third width W3 is too narrow than the appropriate width. As described above, in order to ensure that the light width of the detection light 323 is appropriate, the sensor bracket 330 is rotated based on the output value of the sheet detection sensor 320 to rotate the sheet detection sensor 320, causing the position of the detection light 323 for detecting the floating of the sheet W to be accurately adjusted with respect to the drum 211.

A description is given of the output of the sheet detection sensor 320.

Figure 11A:
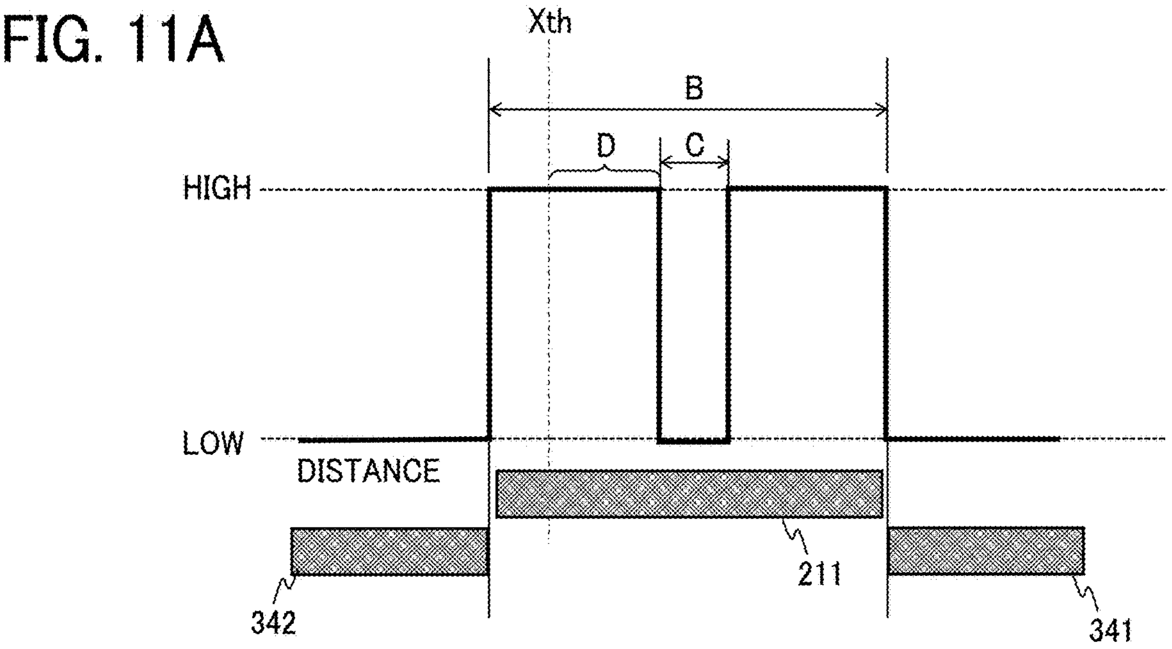
FIGS. 11A, 11B and 11C are diagrams for describing the principle of medium detection in the present embodiment.
Figure 11B:
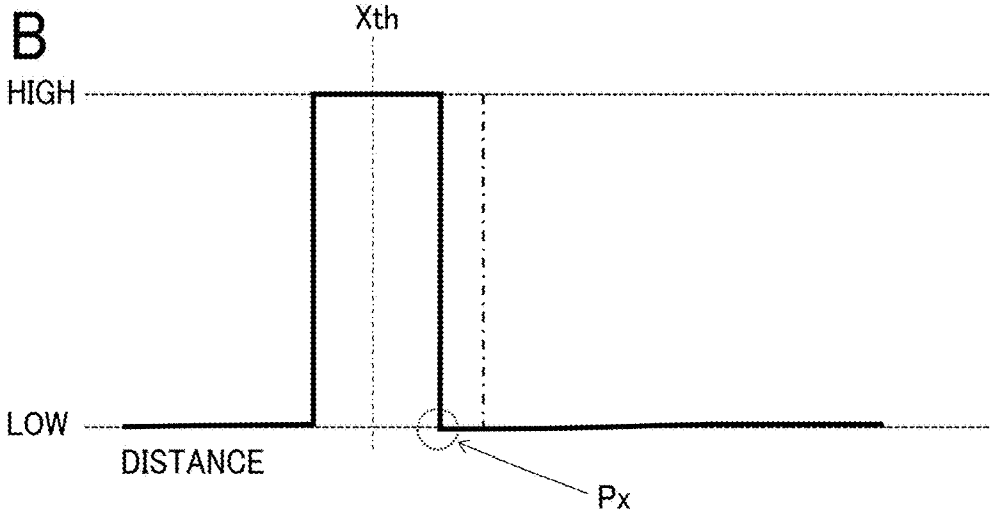
Figure 11C:
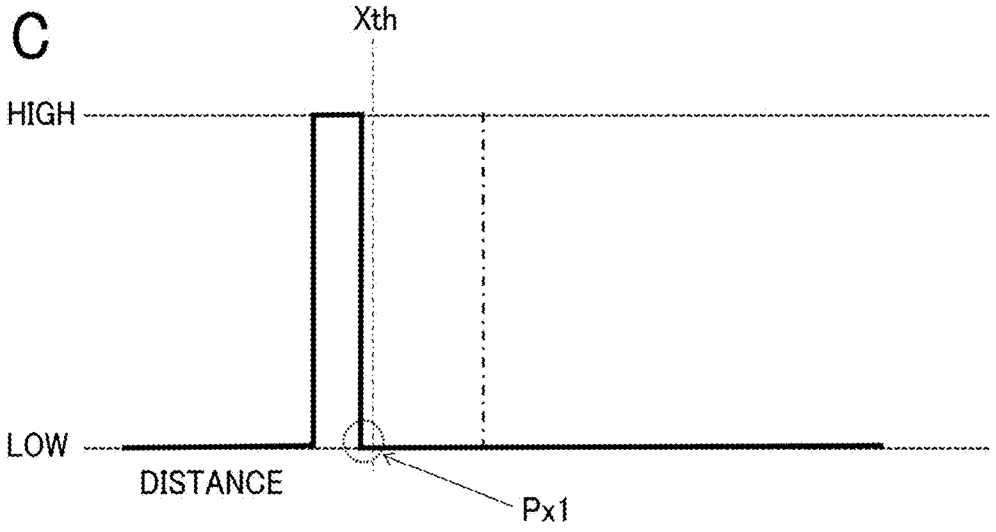

Next, the relationship between the output of the sheet detection sensor 320 and the floating detection of the sheet W will be described with reference to FIGS. 11A, 11B, and 11C. FIGS. 11A, 11B, and 11C illustrate an example of the sensor output when viewed through the drum through hole 2111 or drum recess 2112 described above. FIGS. 11A, 11B, and 11C are graphs illustrating how the output signal level of the sheet detection sensor 320 changes due to the detection light 323 passing through the width of the arrangement distance when the sheet W is conveyed along the outer peripheral surface of the drum 211.

As described with reference to FIGS. 2 to 5, when the sensor bracket 330 is secured at a predetermined position, the light emitter 321 and the light receiver 322 held by the sensor bracket 330 are located outside the drum 211 in the longitudinal direction. In addition, the light emitter 321 and the light receiver 322 are arranged outside the first light shield 341 and the second light shield 342, and the detection light 323 passes through a gap represented by the arrangement distance.

At this time, the drum 211 is rotated while measuring the output value of the sheet detection sensor 320 such that the drum through hole 2111 provided in the drum 211 is located at a position corresponding to the lower end of the detection light 323. When the rotational position is adjusted such that the drum through hole 2111 reaches the lower end position of the detection light 323, the drum 211 stops rotation. This series of control is executed by the image forming controller 215. That is, the sheet detection sensor 320 and the image forming controller 215 constitute a drum position detector for performing alignment control between the detection light 323 and the penetrating portion.

FIG. 11A is an example of output at the time of parallel adjustment. As illustrated in FIG. 11A, in the detection section B corresponding to the arrangement distance, the level of the output signal of the sheet detection sensor 320 becomes "HIGH". In addition, since the detection section B corresponds to the position including the penetrating portion and the penetrated portion of the drum 211, the level of the output signal in the drum section C shielded by the drum 211 becomes "LOW".

The distance corresponding to distance D obtained by adding the thickness of sheet W and a predetermined threshold to the distance at which the output signal level of the detection light 323 parallel to the outer peripheral surface of drum 211 becomes LOW (detection light 323 is shielded) is previously provided as determination reference distance Xth.

FIG. 11B illustrates a state in which floating of the sheet W does not occur. The output signal level at the distance corresponding to the determination reference distance Xth is "HIGH" (not shielded). Note that a position indicated by a broken line circle Px in FIG. 11B corresponds to the upper surface of the sheet W.

FIG. 11C illustrates a case where floating of the sheet W occurs. In this case, the output signal level is "LOW" at a distance shorter than the determination reference distance Xth. That is, the detection light 323 is shielded by the sheet W. Note that a position indicated by a broken line circle Px1 in FIG. 11C corresponds to the upper surface of the sheet W.

As already described, the sensor bracket 330 maintains a state in which the optical axis of the sheet detection sensor 320 is accurately adjusted and secured. Then, the sensor bracket 330 is secured to the housing 310 and can rotate in the housing 310, and adjustment is performed such that the detection light 323 passes between the arrangement distances and the output signal level becomes "HIGH".

The adjustment by the rotation of the sensor bracket 330 can be performed based on the level of the output signal by the detection light 323. Therefore, by checking and adjusting the state of the predetermined output signal while rotating the sensor bracket 330, the detection light 323 can be accurately arranged on the outer peripheral surface of the drum 211.

Since the band-shaped detection light 323 is used, the floating of the sheet W can be detected in the detection range (detection section B corresponding to the arrangement distance) of the detection light 323 even when the thickness of the sheet W changes.

As a result, there is no need to move the position of the detection light 323 in accordance with the sheet thickness as in the comparative example. In addition, an adjustment drive source such as a motor, which is needed in the comparative example, becomes not needed.

In addition, even in a case where the accuracy of the assembly position of the sensor bracket 330 decreases due to the change with time, the error of the determination reference distance Xth due to the change with time can be reduced by detecting the surface of the drum 211 in a state where there is no sheet W before the image forming operation by the inkjet printer 1000.

A description is given of the adjustment of the light shield 340.

Figure 12:
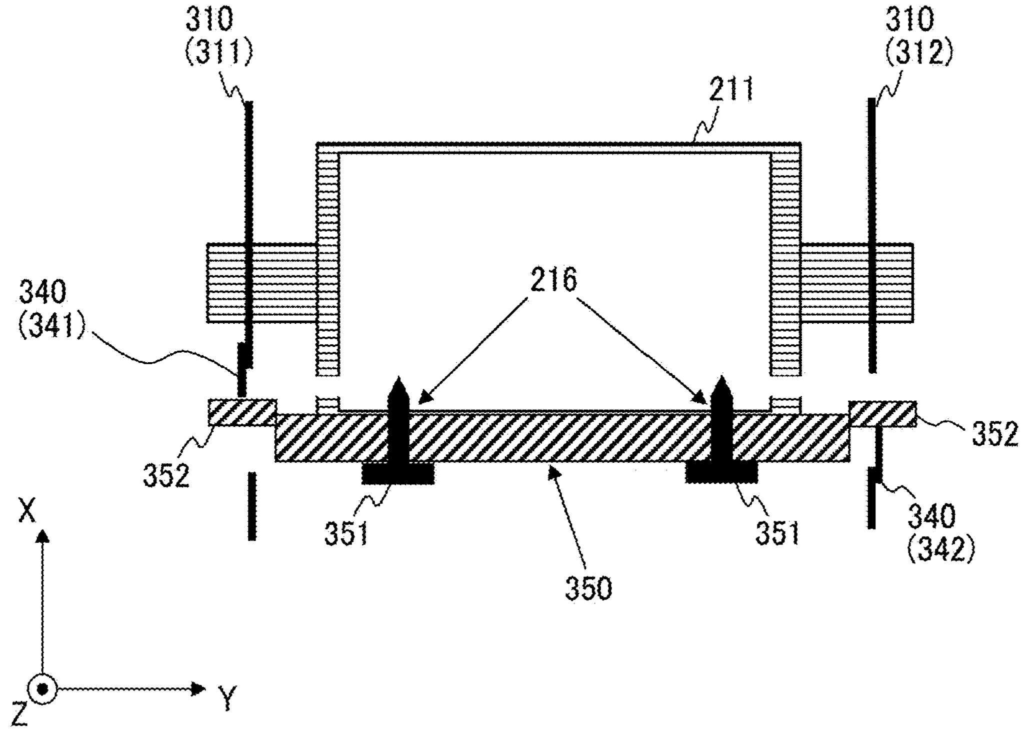
FIG. 12 is a diagram for describing a process of accurately securing the shield according to the present embodiment.

Next, FIG. 12 will be described for a jig 350 that enables accurate setting of the arrangement distance when the light shield 340 is assembled to the housing 310. As illustrated in FIG. 12, in a state where the jig 350 is attached to the drum 211, the light shield 340 (the first light shield 341 and the second light shield 342) is abutted against the jig 350 and secured to the housing 310 as the main body frame.

In order to make the jig 350 and the axial direction of the drum 211 parallel, a jig hole 216 is formed previously on the surface of the drum 211. The jig hole 216 includes a round hole and a long hole, and the round hole and the long hole are formed in a parallel relationship with the axis of the drum 211.

Since a round hole through which the pin 351 penetrates the jig 350 is formed at the position of the jig 350 facing the jig hole 216, the jig 350 is secured to the drum 211 in a state where the pin 351 through which the jig 350 penetrates is aligned with the jig hole 216 of the drum 211.

The jig 350 includes a position adjuster 352 that forms a predetermined interval with the housing 310 in a state where the jig 350 is secured to the drum 211. As illustrated in FIG. 12, the position adjuster 352 is formed at both end portions of the jig 350 in the longitudinal direction (the axial direction of the drum 211). When the light shield 340 is secured to the housing 310, the end portions in the direction orthogonal to the axis of the drum 211 abut against the position adjuster 352, so that the arrangement distance between the first light shield 341 and the second light shield 342 is accurately formed.

In this state, the first light shield 341 and the second light shield 342 are secured to the housing 310. That is, the holding positions are determined and secured by adjusting the positions of the first light shield 341 and the second light shield 342 with respect to the housing 310 in the radial direction of the drum 211. Thus, the relative positions of the first light shield 341 and the second light shield 342 with respect to the drum 211 can be secured in a state of being accurately adjusted. As a result, as described above, the detection light 323 can accurately be adjusted with respect to the outer peripheral surface of the drum 211.

A description is given of the comparison with the comparative example.

Figure 9A:
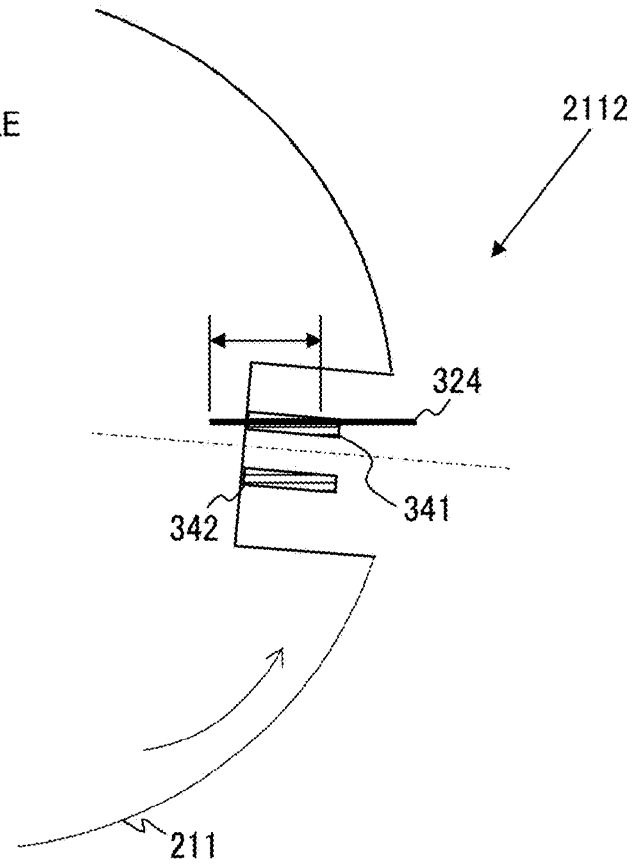
FIGS. 9A and 9B are diagrams of a comparative example with respect to the medium detector according to the present embodiment.
Figure 9B:
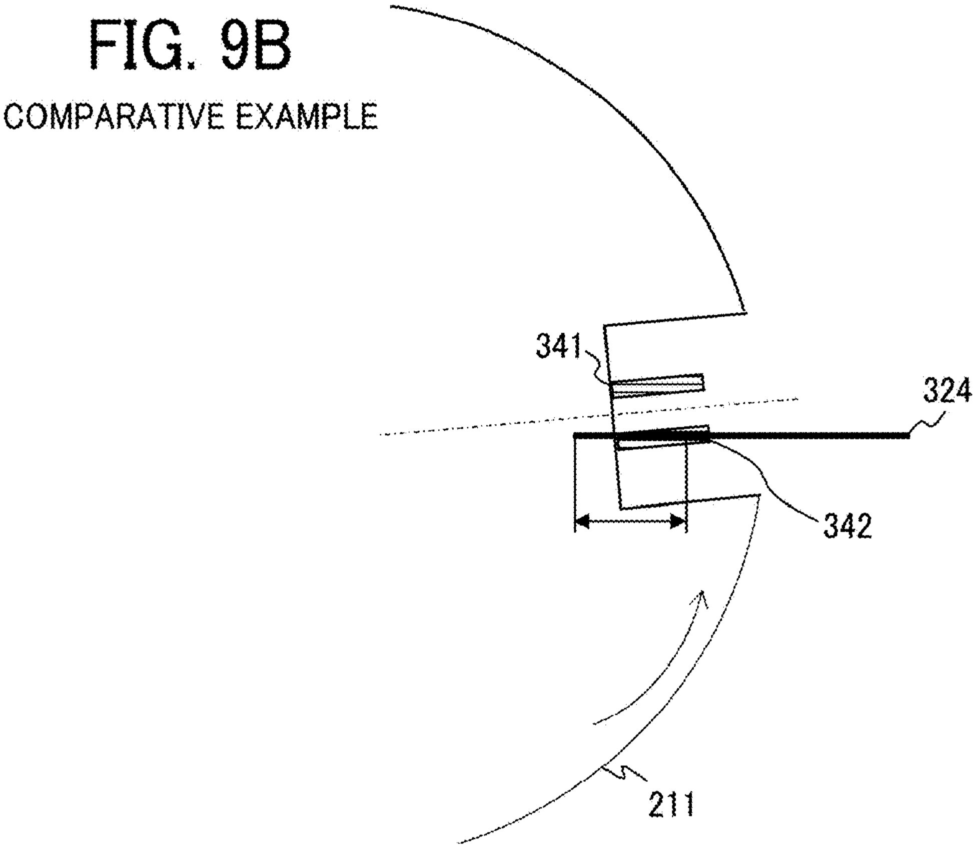
Figure 10:
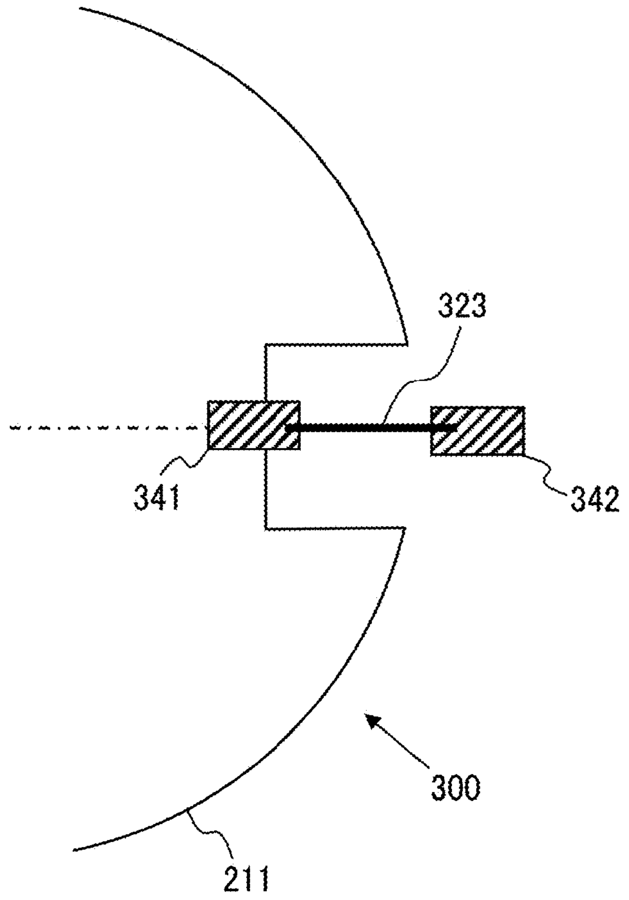
FIG. 10 is a diagram for explaining superiority of the medium detector according to the present embodiment over the comparative example.

Here, in order to make the features of the present embodiment clearer, an adjuster and a method according to a comparative example will be described with reference to FIGS. 9A and 9B. As illustrated in FIGS. 9A and 9B, in the parallel adjustment in the comparative example, the multiple light shields (the first light shield 341 and the second light shield 342) is arranged in the drum recess 2112 formed in the drum 211 and at positions shifted in the rotation direction of the drum 211. The first light shield 341 and the second light shield 342 are arranged at positions shifted in the drum axial direction.

The heights of these two light shields need to be accurately adjusted. The sheet detection sensor 320 reads the heights of the two light shields to check parallelism between the drum 211 and the optical axis 324 of the sheet detection sensor 320.

As described above, in the comparative example, there is a need to measure the heights of the two light shields while rotating the drum 211. Therefore, there is a need to perform the re-measurement by moving one or both of the light emitter 321 and the light receiver 322 at the interval set by the adjuster on the basis of the measurement result, and to perform the measurement result. That is, there is a need to measure the heights of the two light shields while rotating the drum 211 each time the measurement is performed. In the method of the comparative example, since the adjustment is performed while repeating the try and error, the adjustment work is complicated, and the adjustment time may be long.

A medium detector includes: a medium sensor (321, 322) to emit light to detect a medium conveyed by a drum (211) in a conveyance direction; a sensor holder (330) to hold the medium sensor (321, 322); a light shield (341, 342) to shield a part of the light emitted from the medium sensor (321, 322) in an axial direction of the drum (211) orthogonal to the conveyance direction; and a housing (310): rotatably supporting the drum (211); and holding the sensor holder (330) and the light shield (341, 342).

The housing includes: a front frame (311) at one end side of the drum in the axial direction; and a rear frame (312) at another end side of the drum in the axial direction, and the light shield includes: a first light shield (341) attached to the front frame (311); and a second light shield (342) attached to the rear frame (312), and the second light shield (342) is separated from the first light shield in a radial direction orthogonal to the axial direction and the conveyance direction of the drum.

The medium detector includes: a drum position detector (320, 215) to detect a rotational position of the drum (211) having a penetrating portion penetrating through the drum (211) in the axial direction; and circuitry (215) configured to rotate the drum (211) to a detection position at which the light emitted from the medium detector (300) penetrating through the penetrating portion.

The penetrating portion has one of: a penetrating hole (2111) penetrating through the drum in the axial direction; or a recess (2112) recessed from a circumferential surface of the drum (211) and extending in the axial direction.

The drum (211) has multiple penetrating portions including the penetrating portion, and the multiple penetrating portions are disposed at different positions in a circumferential direction of the drum (211).

The medium detector includes: an operation unit (260) to receive an instruction of an inching operation to rotate the drum in a constant rate, wherein the circuitry (215) rotate the drum (211) to perform the inching operation in response to a receipt of the instruction from the operation unit (260) until one of the multiple penetrating portions arrive at the detection position.

The circuitry (215) rotate the drum (211) in a forward direction or a reverse direction in a rotational direction of the drum (211) in the inching operation.

The sensor holder (330) includes: a first end disposed outside the front frame (311) of the housing in the axial direction; a second end disposed opposite to the first end outside the rear frame (312) of the housing in the axial direction; and a central portion disposed between the first end and the second end and facing the drum (211), the central portion having a rotation hole (336), the medium sensor (321, 322) includes: a light emitter (321) at the first end of the sensor holder to emit the light in the axial direction; and a light receiver (322) at the second end of the sensor holder to receive the light emitted from the light emitter, and the sensor holder (330) is rotatable about the rotation hole (336) of the central portion in a horizontal plane.

An image forming apparatus includes: the medium detector (300) to detect a medium held and conveyed on an outer peripheral surface of the drum (211); and multiple liquid discharge heads (100) facing the outer peripheral surface of the drum (211) to discharge a liquid onto the medium.

A medium detector includes: a medium sensor (321, 322) to emit light to detect a medium conveyed by a drum (211) in a conveyance direction; a sensor holder (330) to hold the medium sensor (321, 322); and a housing (310): rotatably supporting the drum (211); holding the sensor holder (330);

and having a recess on an outer peripheral surface of the housing (310), and the recess shielding the light emitted from the medium sensor (321, 322) in an axial direction of the drum (211) orthogonal to the conveyance direction.

A description is given of the features of the present embodiment.

On the other hand, according to the floating detector 300 of the present embodiment, the adjustment can be performed by measuring one point in the arrangement interval between the first light shield 341 and the second light shield 342. The adjustment can be performed by rotating the sensor bracket 330, and the measurement and the adjustment while rotating the drum 211 are no needed, so that the adjustment can be easily performed.

In addition, since there is only a need to rotate the sensor bracket 330 while viewing the output value of the sheet detection sensor 320, the drum 211 may be in a stopped state when the parallel position adjustment of the drum 211 and the sheet detection sensor 320 is performed.

As described above, in the floating detector 300 according to the present embodiment, since the optical axis of the sheet detection sensor 320 whose secured position has been adjusted in the sensor bracket 330 can be adjusted merely by rotating the sensor bracket 330 with respect to the housing 310, the parallel adjustment of the detection light 323 with respect to the outer peripheral surface of the drum 211 can be easily performed.

Moreover, the parallel adjustment may be performed based on the output value of the sheet detection sensor 320 while the drum 211 is stopped because there is no need to rotate the drum. Therefore, the adjustment time can be shortened.

As described above, according to the floating detector 300 of the present embodiment, the optical axes of the light emitter 321 and the light receiver 322 can accurately be adjusted when the light emitter 321 and the light receiver 322 is secured to the sensor bracket 330 serving as the sensor stay. Since this adjustment can be performed on a workstation, workability is improved, and the optical axis adjustment time can be shortened.

In the parallel adjustment of the optical axes of the drum 211 and the detection light 323, the light shield 340 whose the positional relationship with the drum 211 is correctly adjusted is previously secured to the housing 310. By aligning the optical axis of the detection light 323 with respect to the light shield 340, parallel adjustment between the drum 211 and the optical axis can be performed. Therefore, the parallel adjustment can be performed without rotating drum 211, and the adjustment time can be shortened.

A description is given of the detection position adjustment method the in medium detector.

Figure 13:
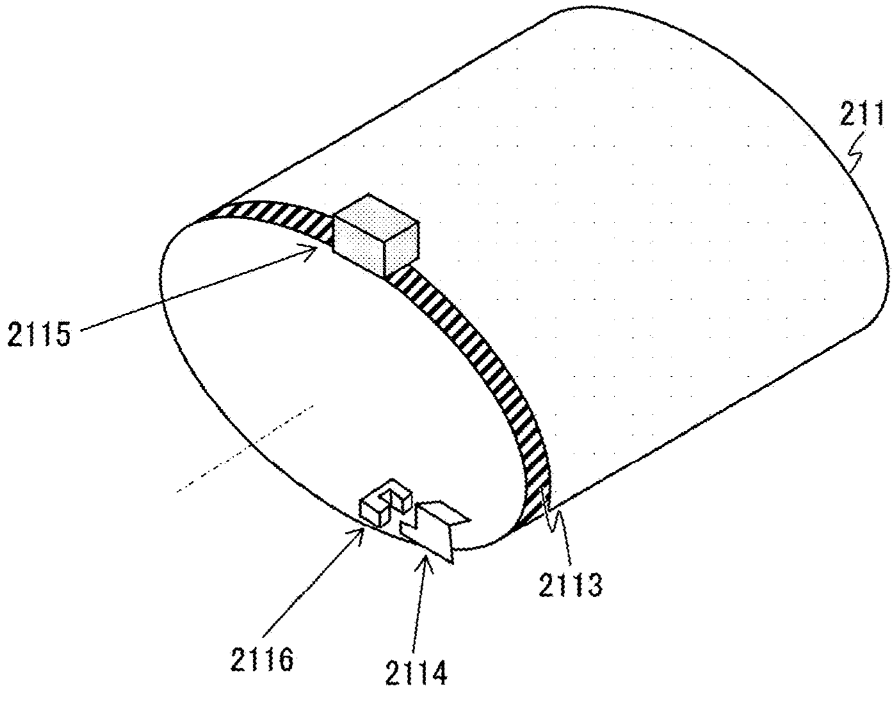
FIG. 13 is a diagram for describing a configuration used in a parallel adjustment process between an optical axis and a rotary member of the sensor according to the present embodiment.

Next, an embodiment of a detection position adjustment method in the medium detector according to the present embodiment will be described. The following description corresponds to a method of adjusting the detection light 323 in parallel to the drum 211 in the floating detector 300. As illustrated in FIG. 13, in order to adjust the position of the detection light 323 such that the drum 211 and the detection light 323 are parallel to each other, the floating detector 300 that performs the detection position adjustment method needs to align the detection light 323 to the position of the drum through hole 2111 while rotating the drum 211. As a method of performing this alignment, the following first to fourth examples will be exemplified.

A description is given of the first example.

As illustrated in FIG. 13, an encoder sheet 2113 is attached to the outer peripheral surface of the drum 211. A home position actuator 2114 is attached to the drum 211. Then, it is assumed that an encoder sensor 2115 and a home position sensor 2116 are previously attached to the housing 310.

First, after the initial position of the drum 211 is detected by the home position sensor 2116, a motor that rotates the drum 211 is operated to rotate the drum 211 in a predetermined direction. The rotation amount of the drum 211 at that time is read by the encoder sensor 2115. Based on the reading result, the rotation of the drum 211 is stopped at a position where the drum through hole 2111 comes to the detection light position of the sheet detection sensor 320 for calculation. Regarding the position of the drum through hole 2111, since the rotation angle from the initial position (home position) of the drum 211 is known in advance, the drum through hole 2111 can be stopped at the detection light position.

A description is given of the second example.

The output value of the sheet detection sensor 320 is read while the drum 211 is automatically rotated by driving the motor. When the output value on the outer peripheral surface of the drum 211 disappears, the rotation of the drum 211 is stopped. When the drum through hole 2111 is adjusted to the position of the detection light 323 according to the second example, the home position sensor 2116 and the encoder sensor 2115 are no needed as compared with the first example, so that the cost of the floating detector 300 can be reduced.

A description is given of the third example.

It is assumed that the floating detector 300 can execute the “dimension feeding operation” in which the drum 211 is rotated only while the inching button 260 is operated (the pressing operation is mainly described as an inching operation). The inching button 260 is independently provided for forward rotation or reverse rotation of the drum 211. That is, it is assumed that the floating detector 300 includes two inching buttons 260 at positions where the user can perform the inching operation.

In addition, the detection light 323 in this example is visible light that can be visually recognized by the user.

First, the user presses the inching button 260 to rotate the drum 211. At this time, the user continues the rotation of drum 211 while confirming that the position of the drum through hole 2111 is aligned with the position of the detection light 323. The user releases the inching button 260 at a timing when the position of the drum through hole 2111 is aligned with the position of the detection light 323. As a result, the drum 211 stops in a state where the position of the drum through hole 2111 is aligned with the position of the detection light 323.

When the method of the third example is used, since the position adjustment can be performed merely manually by the user, the control for the position adjustment becomes no needed.

A description is given of the fourth example.

Similarly to the third example, another example of a method of manually aligning the position of the drum through hole 2111 with the position of the detection light 323 by the user will be described. Note that the detection light 323 in this example is visible light.

The user manually rotates the drum 211 without using power such as a motor. At this time, the user continues the rotation of drum 211 while confirming that the position of the drum through hole 2111 is aligned with the position of the detection light 323. When the position of the drum through hole 2111 is adjusted to be aligned with the detection light 323 according to the fourth example, the inching button 260 is no needed as compared with the third example, so that the cost of the floating detector 300 can be reduced.

The present disclosure is not limited to specific embodiments described above, and numerous additional modifications and variations are possible in light of the teachings within the technical scope of the appended claims. It is therefore to be understood that the disclosure of this patent specification may be practiced otherwise by those skilled in the art than as specifically described herein, and such, modifications, alternatives are within the technical scope of the appended claims. Such embodiments and variations thereof are included in the scope and gist of the embodiments of the present disclosure and are included in the embodiments described in claims and the equivalent scope thereof.

A description is given of the aspects of the present embodiment.

The contents of the present embodiment are, for example, as follows.

Aspect 1

According to Aspect 1, a medium detector detects a medium conveyed along a drum-shaped member, the medium detector including:

- a medium detection sensor configured to detect the medium at a conveyance position with respect to the drum-shaped member;
- a sensor holder configured to hold the medium detection sensor;
- a light shield configured to shield light used by the medium detection sensor in a direction of a rotation axis of the drum-shaped member; and
- a housing configured to support the drum-shaped member and enable the drum-shaped member to rotate,
- the light shield being a light shield secured to the housing, and
- the sensor holder and the light shield being held by the housing.

Aspect 2

According to Aspect 2, in the medium detector of Aspect 1,

- the light shield is adjusted so that a relative position with respect to the housing is a holding position serving as a predetermined position in a radial direction of the drum-shaped member.

Aspect 3

According to Aspect 3, a medium detector detects a medium conveyed along a drum-shaped member, the medium detector including:

- a medium detection sensor configured to detect the medium at a conveyance position with respect to the drum-shaped member;
- a sensor holder configured to hold the medium detection sensor;
- a light shield configured to shield light used by the medium detection sensor in a direction of a rotation axis of the drum-shaped member; and
- a housing configured to support the drum-shaped member and enable the drum-shaped member to rotate,
- the light shield being a recess formed by recessing a part of an outer peripheral surface of the housing,
- the recess being formed in the housing at a position defining a width of the light, and
- the sensor holder being held by the housing.

Aspect 4

According to Aspect 4, the medium detector of any one of Aspect 1 to Aspect 3 includes a drum position detector that detects a rotational position of the drum-shaped member,

- in which the drum position detector rotates the drum-shaped member until positions of a penetrating portion provided in the drum-shaped member and the light have a predetermined positional relationship.

Aspect 5

According to Aspect 5, in the medium detector of Aspect 4,

- multiple penetrating portions is provided in a circumferential direction of the drum-shaped member.

Aspect 6

According to Aspect 6, the medium detector of Aspect 5 includes an operation unit that instructs a dimension feeding operation of the drum-shaped member,

- in which the drum position detector causes the drum-shaped member to perform a dimension feeding operation according to an operation of the operation unit until positions of the penetrating portion and the light have a predetermined positional relationship.

Aspect 7

According to Aspect 7, in the medium detector of Aspect 6,

- the dimension feeding operation is an operation of rotating the drum-shaped member in a direction of forward rotation or reverse rotation.

Aspect 8

According to Aspect 8, in the medium detector of Aspect 1 or Aspect 3,

- the medium detection sensor includes a light emitting sensor that emits the light from one end portion side toward another end portion side of the rotation axis of the drum-shaped member, and a light reception sensor that receives the light, and
- the sensor holder holds a relative positional relationship between the light emitting sensor and the light reception sensor to adjust the relative positional relationship in a direction parallel to a conveyance direction of the medium and in a direction perpendicular to an optical axis direction of the light such that the light shield shields a part of the light and does not shield another part of the light.

Aspect 9

According to Aspect 9, an image forming apparatus includes:

- multiple liquid discharge heads that is disposed on an outer peripheral surface of a drum-shaped member that conveys a medium, and discharges liquid onto the medium to form an image; and
- a medium detector that detects a medium held and conveyed on an outer peripheral surface of the drum-shaped member,
- in which the medium detector is the medium detector of any one of Aspect 1 to Aspect 8.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein such as the controller 215 may be implemented using circuitry or processing circuitry which includes general purpose processors, special purpose processors, integrated circuits, ASICs ("Application Specific Integrated Circuits"), FPGAs ("Field-Programmable Gate Arrays"), and/or combinations thereof which are configured or programmed, using one or more programs stored in one or more memories, to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein which is programmed or configured to carry out the recited functionality.

There is a memory that stores a computer program which includes computer instructions. These computer instructions provide the logic and routines that enable the hardware (e.g., processing circuitry or circuitry) to perform the method disclosed herein. This computer program can be implemented in known formats as a computer-readable storage medium, a computer program product, a memory device, a record medium such as a CD-ROM or DVD, and/or the memory of a FPGA or ASIC.

The invention claimed is:

1. A medium detector comprising:

a medium sensor to emit light to detect a medium conveyed by a drum in a conveyance direction;

a sensor holder to hold the medium sensor;

a light shield to shield a part of the light emitted from the medium sensor in an axial direction of the drum orthogonal to the conveyance direction; and a housing:

rotatably supporting the drum; and holding the sensor holder and the light shield, wherein the light shield is secured to the housing so that a position of the light shield is arranged in a direction orthogonal to a direction of a rotation axis of the drum supported by the housing, and wherein the housing includes:

a front frame at one end side of the drum in the axial direction; and a rear frame at another end side of the drum in the axial direction, and the light shield includes:

a first light shield attached to the front frame; and a second light shield attached to the rear frame, and the second light shield is separated from the first light shield in a radial direction orthogonal to the axial direction and the conveyance direction of the drum.

2. The medium detector according to claim 1, further comprising:

a drum position detector to detect a rotational position of the drum having a penetrating portion penetrating through the drum in the axial direction; and circuitry configured to rotate the drum to a detection position at which the light emitted from the medium detector penetrating through the penetrating portion.

3. The medium detector according to claim 2, wherein the penetrating portion has one of:

a penetrating hole penetrating through the drum in the axial direction; or a recess recessed from a circumferential surface of the drum and extending in the axial direction.

4. The medium detector according to claim 2, wherein the drum has multiple penetrating portions including the penetrating portion, and the multiple penetrating portions are disposed at different positions in a circumferential direction of the drum.

5. The medium detector according to claim 4, further comprising:

an operation unit to receive an instruction of an inching operation to rotate the drum in a constant rate, wherein the circuitry rotate the drum to perform the inching operation in response to a receipt of the instruction from the operation unit until one of the multiple penetrating portions arrive at the detection position.

6. The medium detector according to claim 5, wherein the circuitry rotates the drum in a forward direction or a reverse direction in a rotational direction of the drum in the inching operation.

7. An image forming apparatus comprising:

the medium detector according to claim 1 to detect a medium held and conveyed on an outer peripheral surface of the drum; and multiple liquid discharge heads facing the outer peripheral surface of the drum to discharge a liquid onto the medium.

8. A medium detector comprising:

a medium sensor to emit light to detect a medium conveyed by a drum in a conveyance direction;

a sensor holder to hold the medium sensor;

a light shield to shield a part of the light emitted from the medium sensor in an axial direction of the drum orthogonal to the conveyance direction; and a housing:

rotatably supporting the drum; and holding the sensor holder and the light shield, wherein the light shield is secured to the housing so that a position of the light shield is arranged in a direction orthogonal to a direction of a rotation axis of the drum supported by the housing, wherein the housing includes:

a front frame at one end side of the drum in the axial direction; and a rear frame at another end side of the drum in the axial direction, and the light shield includes:

a first light shield attached to the front frame; and a second light shield attached to the rear frame, and the second light shield is separated from the first light shield in a radial direction orthogonal to the axial direction and the conveyance direction of the drum, and wherein the sensor holder includes:

a first end disposed outside the front frame of the housing in the axial direction;

a second end disposed opposite to the first end outside the rear frame of the housing in the axial direction; and a central portion disposed between the first end and the second end and facing the drum, the central portion having a rotation hole, the medium sensor includes:

a light emitter at the first end of the sensor holder to emit the light in the axial direction; and a light receiver at the second end of the sensor holder to receive the light emitted from the light emitter, and the sensor holder is rotatable about the rotation hole of the central portion in a horizontal plane.

9. The medium detector according to claim 8, further comprising:

a drum position detector to detect a rotational position of the drum having a penetrating portion penetrating through the drum in the axial direction; and circuitry configured to rotate the drum to a detection position at which the light emitted from the medium detector penetrating through the penetrating portion.

10. The medium detector according to claim 9, wherein the penetrating portion has one of:

a penetrating hole penetrating through the drum in the axial direction; or a recess recessed from a circumferential surface of the drum and extending in the axial direction.

11. The medium detector according to claim 9, wherein the drum has multiple penetrating portions including the penetrating portion, and the multiple penetrating portions are disposed at different positions in a circumferential direction of the drum.

12. The medium detector according to claim 11, further comprising:

an operation unit to receive an instruction of an inching operation to rotate the drum in a constant rate, wherein the circuitry rotate the drum to perform the inching operation in response to a receipt of the instruction from the operation unit until one of the multiple penetrating portions arrive at the detection position.

13. The medium detector according to claim 12, wherein the circuitry rotates the drum in a forward direction or a reverse direction in a rotational direction of the drum in the inching operation.

14. A medium detector comprising:

a medium sensor to emit light to detect a medium conveyed by a drum in a conveyance direction;

a sensor holder to hold the medium sensor; and a housing:

rotatably supporting the drum;

holding the sensor holder; and having a recess on an outer peripheral surface of the housing, and the recess shielding the light emitted from the medium sensor in an axial direction of the drum orthogonal to the conveyance direction, wherein the recess is formed on the outer peripheral surface of the housing so that a position of the recess is arranged in a direction orthogonal to a direction of a rotation axis of the drum supported by the housing.

15. The medium detector according to claim 14, further comprising:

a drum position detector to detect a rotational position of the drum having a penetrating portion penetrating through the drum in the axial direction; and circuitry configured to rotate the drum to a detection position at which the light emitted from the medium detector penetrating through the penetrating portion.

16. The medium detector according to claim 15, wherein the penetrating portion has one of:

a penetrating hole penetrating through the drum in the axial direction; or a recess recessed from a circumferential surface of the drum and extending in the axial direction.

17. The medium detector according to claim 15, wherein the drum has multiple penetrating portions including the penetrating portion, and the multiple penetrating portions are disposed at different positions in a circumferential direction of the drum.

18. The medium detector according to claim 17, further comprising:

an operation unit to receive an instruction of an inching operation to rotate the drum in a constant rate, wherein the circuitry rotate the drum to perform the inching operation in response to a receipt of the instruction from the operation unit until one of the multiple penetrating portions arrive at the detection position.

19. The medium detector according to claim 18, wherein the circuitry rotates the drum in a forward direction or a reverse direction in a rotational direction of the drum in the inching operation.

* * * * *